United States Patent [19]

Pfenninger et al.

[11] Patent Number: 4,535,848
[45] Date of Patent: Aug. 20, 1985

[54] WING LIFT FOR FOLDABLE IMPLEMENTS

[75] Inventors: Billy J. Pfenninger; F. Harrison Stansel, both of Hutchinson, Kans.

[73] Assignee: Krause Plow Corporation, Hutchinson, Kans.

[21] Appl. No.: 523,958

[22] Filed: Aug. 17, 1983

[51] Int. Cl.³ .............................................. A01B 63/32
[52] U.S. Cl. .................... 172/311; 172/456; 172/501
[58] Field of Search ............... 172/311, 446, 456, 466, 172/662, 776, 501

[56] References Cited

U.S. PATENT DOCUMENTS

| | | | |
|---|---|---|---|
| 3,680,172 | 8/1972 | Couser | 172/776 X |
| 3,783,951 | 1/1974 | Gugin | 172/311 |
| 3,797,580 | 3/1974 | Roth | 172/311 |
| 3,814,191 | 6/1974 | Tilburn | 172/311 |
| 3,844,358 | 10/1974 | Shuler | 172/311 |
| 3,944,001 | 3/1976 | Warner et al. | 172/311 |
| 4,023,623 | 5/1977 | Anderson | 172/311 |
| 4,074,766 | 2/1978 | Orthman | 172/456 X |
| 4,116,282 | 9/1978 | Hansen | 172/311 |
| 4,178,998 | 12/1979 | Rockwell | 172/311 |
| 4,232,747 | 11/1980 | Pfenninger et al. | 172/311 |
| 4,415,043 | 11/1983 | Hadler et al. | 172/311 X |
| 4,453,601 | 6/1984 | Orthman et al. | 172/311 |

Primary Examiner—Richard J. Johnson
Attorney, Agent, or Firm—Schmidt, Johnson, Hovey & Williams

[57] ABSTRACT

Wings of multiple section farm implements are folded by hydraulic cylinders each having a knee joint between the piston rod and a single arm which swings against a lug on the wing as the rod is actuated to lift the wing. A trunnion-notch arrangement operating in conjunction with a lost motion connection and an anti-jack-knife device maintains a rod-arm interlock during a portion of each cycle of swinging of the wing to and from its folded position.

5 Claims, 7 Drawing Figures

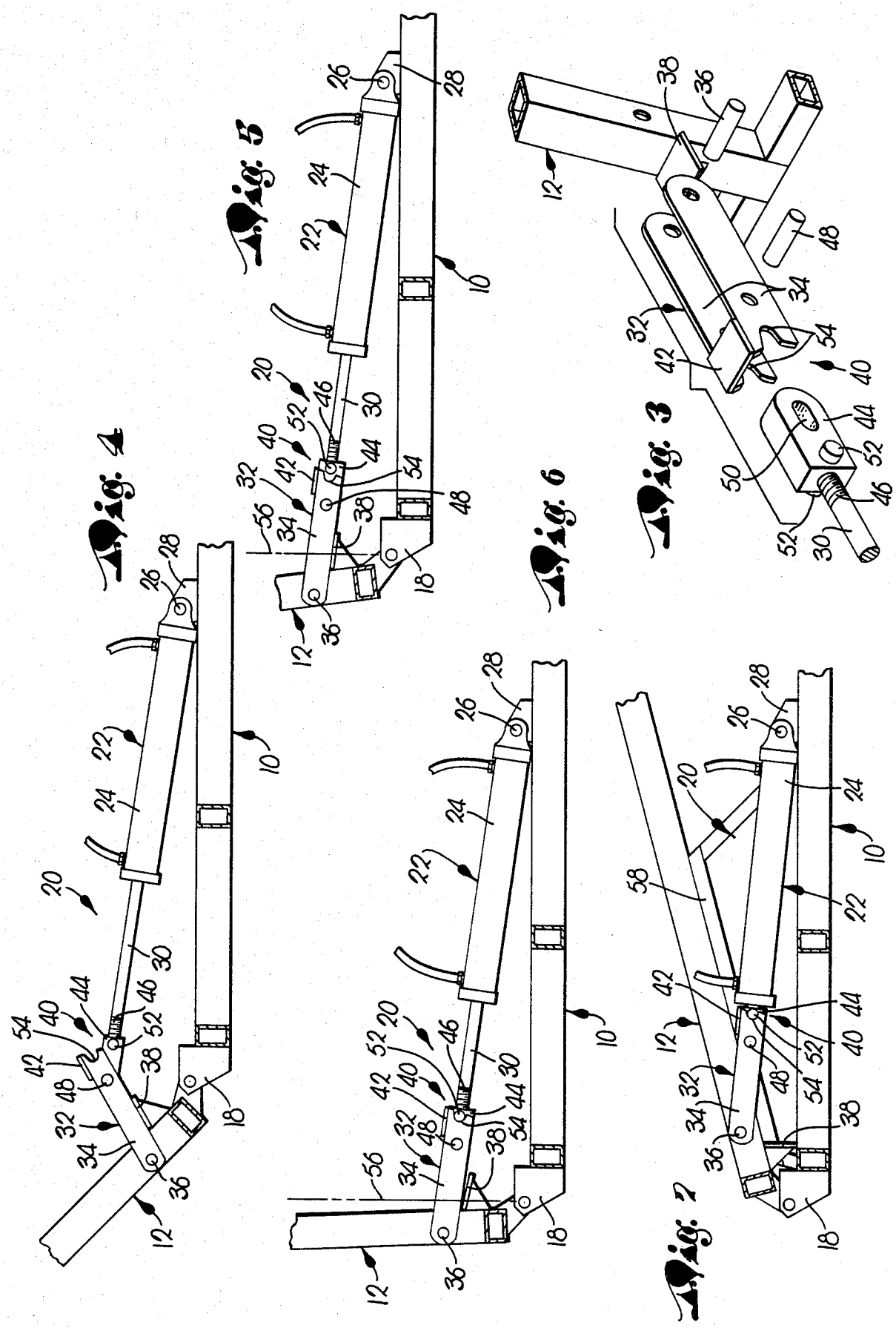

WING LIFT FOR FOLDABLE IMPLEMENTS

Our present invention relates to improvements in wing lift mechanisms for foldable implements such as field cultivators, chisel plows and similar tillage equipment having one or more outrigger or wing frames hingedly connected to a main or central frame.

Such mechanism, which normally includes the use of hydraulic cylinders as the source of power, designed to permit, through lost motion connections, flotation of the wings during tillage, is also capable of raising the wings from their horizontal working positions such as to reduce the transverse dimension of the implement for clearing gate openings, facilitating over-the-road travel and reducing space requirements for storage.

Among the U.S. Letters Patent with which we are familiar is U.S. Pat. No. 3,783,951, Gugin, 1/1974, using three links for raising the wing frames to a position extending vertically from the central frame section.

In U.S. Pat. No. 3,797,580, Roth, 3/1974, on the other hand, the wing frame is folded to an inclined position over the main frame, but once again through links connected to both the main and wing frame sections. Tilburn, U.S. Pat. No. 3,814,191 of 6/1974 also employs multiple links, but suggesting also in one embodiment direct pivotal connection of the piston rod to the wind frame, as provided similarly in Shuler, U.S. Pat. No. 3,844,358 of 10/1974.

Single links are used in Anderson, U.S. Pat. No. 4,023,623 of 5/1977 and Hansen, U.S. Pat. No. 4,116,282 of 9/1978, but in association with the hinges between the frame sections. An abutment for the link is also provided, but again, on the hinge in each instance.

In a somewhat different arrangement, we adopted the double link concept in our U.S. Pat. No. 4,232,747 of 11/1980, as in Rockwell, U.S. Pat. No. 4,178,998 of 12/1979, showing additionally a clevis-link abutment to control wing movement from the upright to the folded position.

As distinguished from all of the above, for ease of manufacture, cost reduction, simplicity and improved performance, we employ but a single link or arm pivotally connected directly to the wing frame, together with an arm-abutting lug rigid to the wing between the arm and the hinge, both entirely disassociated from the hinges.

We also incorporate the lost motion connection for flotation purposes, as well as the link-to-piston rod abutment, but in an improved arrangement which uses a novel trunnion-notch interlock and an associated slot-pin connection for relative movement between the piston rod and the link.

In the drawings:

FIG. 3 is a fragmentary, exploded, detailed, perspective view showing the wing frame-to-piston rod connection;

FIG. 4 is a view similar to FIG. 2 showing the position of the wing frame at its initial lifting stage;

FIG. 5 is a view similar to FIG. 4 showing the position of the wing frame at a succeeding stage of lift;

FIG. 6 is a view similar to FIG. 5 showing the upright position of the wing frame; and FIG. 7 is a fragmentary side elevational view showing the wing frame in its folded position.

Figure 1:
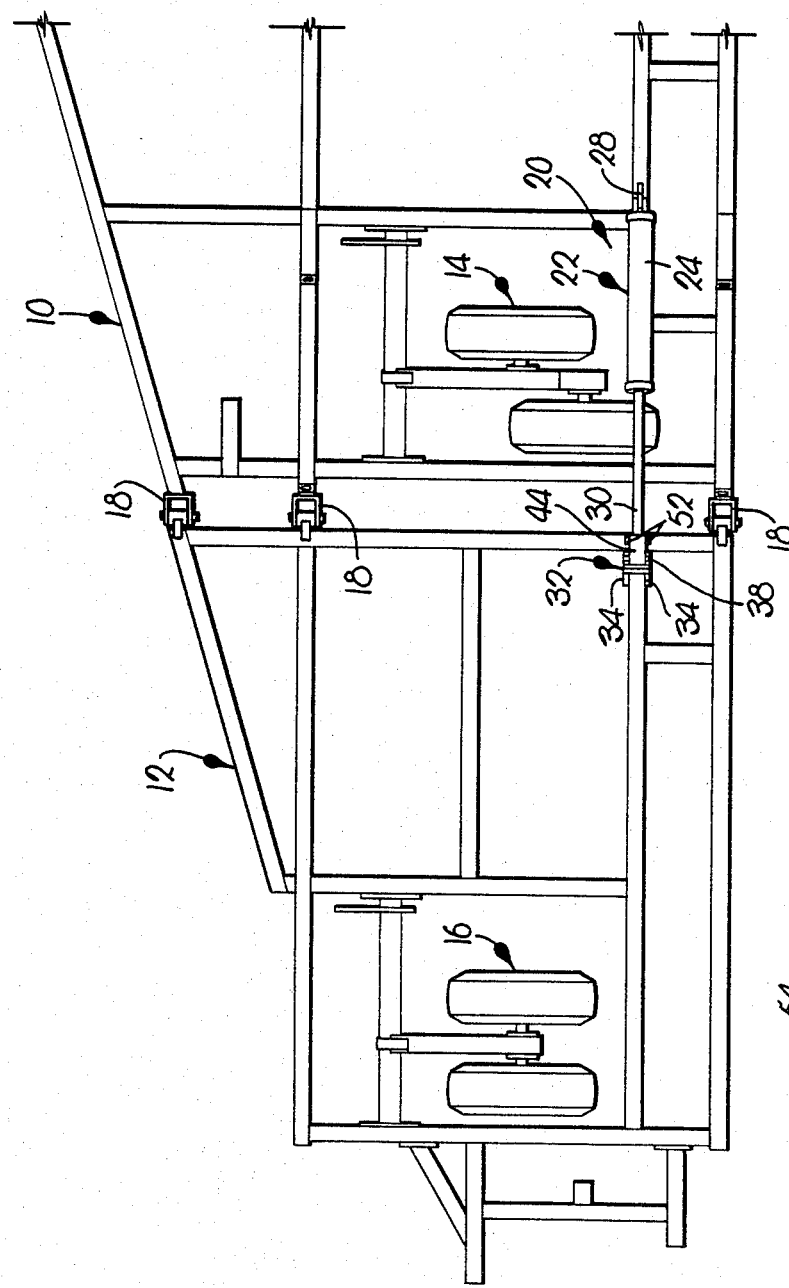
FIG. 1 is a fragmentary top plan view of a foldable implement showing the improved wing lift mechanism of our present invention.
Figure 2:
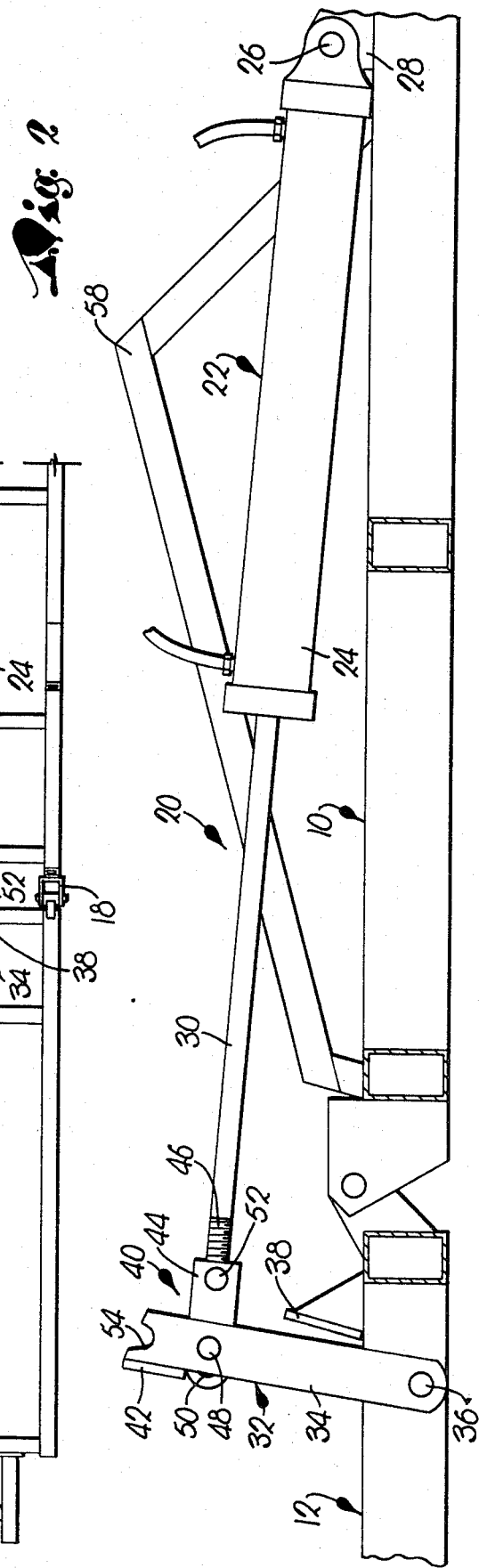
FIG. 2 is an enlarged, fragmentary, side elevational view thereof.

FIGS. 1 and 2 of the drawings show the normal horizontal working position of a farm implement main frame 10 and wing frame 12, supported by wheels 14 and 16 respectively and provided with hinges 18 which pivotally attach the frame 12 to the frame 10 for up-and-down swinging movement about a normally horizontal, fore and aft axis. Lift mechanism 20, normally overlying the frames 10 and 12, is provided for swinging the frame 12 from the position shown in FIGS. 1 and 2 to the upright position shown in FIG. 6 and thence to the folded position shown in FIG. 7 overlying the frame 12 at which time the mechanism 20 is disposed between the frames 10 and 12. As noted in FIG. 7, the frame 12 rather closely approaches a horizontal position when thus folded.

The mechanism 20 includes an elongated, double-acting, fluid pressure (e.g. hydraulic), piston and cylinder assembly 22 which has a cylinder 24 provided at one of its ends with a pin 26 pivotally connecting the cylinder 24 with a bracket 28 rigid to the frame 10 remote from the proximal hinge 18. The assembly 22 is also provided with a reciprocable piston rod 30 which extends outwardly toward the frame 12 from the opposite end of the cylinder 24.

A single, elongated arm 32, in the nature of a pair of spaced bars 34 which embrace a frame piece of wing 12 (FIGS. 1 and 3) normally stands upwardly as shown in FIG. 2 with the longitudinal axis of the arm 32 angularly offset relative to the longitudinal axis of the assembly 22. A pin 36 pivotally connects the arm 32 directly to the frame 12 at the lowermost end of the arm 32 adjacent but spaced from the proximal hinge 18.

An upstanding lug 38, rigid to the frame 12, is disposed between the arm 32 and the proximal hinge 18 for engagement by the arm 32 to prevent arm 32 from swinging in one direction about the pin 36 as the arm 32 transmits a pulling force from the assembly 22 to the frame 12 as will hereinafter be made clear.

A knee joint 40 adjacent the uppermost end of the arm 32 presents an articulation between the arm 32 and the outermost end of the rod 30 such that, upon retraction of the rod 30, a pulling force is applied to the joint 40 to raise the frame 12 from the horizontal position (FIGS. 1 and 2) to the upright position (FIG. 6) thereby moving the longitudinal axis of the arm 32 into alignment with the longitudinal axis of the assembly 22 (FIGS. 5, 6 and 7) until the frame 12 reaches the folded position (FIG. 7).

The arm 32 is provided with stop means in the nature of a plate 42 which overlies a lost motion connection forming a part of the joint 40 after the aforementioned axes become aligned (FIGS. 5–7) for precluding downward jackknifing of the joint 40. As best seen in FIG. 3, the plate 42 rigidly interconnects the bars 34 remote from the pivot pin 36.

A block 44 is secured to the rod 30 at its outermost end by screw threads 46 fitted into internally tapped block 44. A pivot pin 48 traverses the block 44 and the arm 32, the abovementioned lost motion connection being a slot 50 (FIGS. 2 and 3) in the block 44 which receives the pin 48.

The block 44 is provided with trunnion means in the nature of a pair of studs 52 rigid thereto and extending laterally therefrom in opposite directions, and each bar 34 has a stud-receiving notch 54 at the normally uppermost end thereof.

OPERATION

In the working position of the frame 12 (FIGS. 1 and 2), with the rod 30 extended to the outermost end of its stroke, the frame 12 is restrained against downward movement only after it moves down about 6° about the hinges 18 by the abutment of the pin 48 against the outer end of the slot 50. But the floating frame 12 is free to rise about the hinges 18 as the pin 48 slides along the slot 50 toward the inner end of the latter during movement of the wheels 14 and 16 over uneven terrain.

Through use of the mechanism 22, the frame 12 may be swung about the hinges 18 to the position shown in FIG. 4 by retraction of the rod 30. A pulling force is exerted on the arm 32 and the lug 38, and therefore on the frame 12 as the assembly 22 pivots about the pins 26 and 48 which are parallel to the hinge pins for the hinges 18 as well as the pin 36.

When the frame 12 reaches the position shown in FIG. 5, the block 44 will have moved into engagement with the plate 42 and the axes of the arm 32 and the assembly 22 will have moved into alignment. As the frame 12 reaches the upright position shown in FIG. 6 it will, by its own inherent weight, swing past the center of gravity represented by line 56 (FIGS. 5 and 6) causing the arm 32 to shift toward the rod 30 as the pin 48 moves along the slot 50 toward the rod 30. The arm 32 and the assembly 22 being then aligned, the studs 52 will enter the notches 54, thereby interlocking the block 44 and the bars 34. It is thus seen that the lost motion connection (slot 50 and pin 48) of the joint 40 has a second function in addition to providing flotation for the frame 12.

The interlock between studs 52 and the notches 54 continues until the frame 12 falls to the folded position (restrained by the assembly 22) shown in FIG. 7, engaging an inclined rest 58 (shown also in FIG. 2) rigid to the frame 10 thereabove. Noteworthy is the fact that the arm 32 does not swing about the pin 36 and leave its full engagement with the lug 38 prior to reaching the position shown in FIG. 6. Minute adjustment for effecting proper and precise operation as above explained is made possible by the screw threaded connection at 46 of the block 44 to the rod 30.

Conversely, to return the frame 12 to its working position, the rod 30 is extended from its fully retracted position shown in FIG. 7 to exert a direct thrust on the arm 32 through the studs 52 and notches 54. After the frame 12 reaches the past center position the arm 32 shifts once again to the position shown in FIG. 5 and descent of the frame 12 is restrained by the assembly 22 as the arm 32 then remains in engagement with the lug 38, exemplified by FIGS. 2, 4 and 5.

We claim:

1. In a farm implement having a normally horizontal, main, wheel-supported frame and a wheel-supported wing frame having a normally horizontal position and provided with hinge means pivotally attaching the same to the main frame for up and down swinging movement about a normally horizontal, fore and aft axis, mechanism normally overlying the frames for swinging the wing frame about said hinge means from said horizontal position to an upright position and thence to a folded position overlying the main frame with said mechanism disposed between the frames, said mechanism including:
    an elongated, double-acting, fluid pressure, piston and cylinder assembly having a longitudinal axis, said assembly being provided with a cylinder having means at one end thereof pivotally connecting the same to said main frame remote from the hinge means and a reciprocable piston rod having an outermost end and extending outwardly from the opposite end of the cylinder;
    a single, elongated, normally upstanding arm having its longitudinal axis angularly offset relative to the longitudinal axis of said assembly when the wing frame is in said horizontal position;
    means pivotally connecting the arm directly to the wing, frame at the normally lowermost end of the arm adjacent, but spaced from the hinge means;
    a knee joint adjacent the uppermost end of the arm presenting an articulation between the arm and the outermost end of the rod whereby, upon retraction of the rod, a pulling force is applied to the joint to raise the wing frame from said horizontal position to said upright position and to move said axis of the arm into alignment with said axis of the assembly until the wing frame reaches the folded position;
    an upstanding lug rigid to the wing frame said disposed between the arm and the hinge means for engagement by the arm and transmitting said pulling force from the assembly to the wing frame,
    a block secured to the rod at the outermost end of the latter;
    means pivotally connecting the block to the arm at the normally uppermost end of the arm; presenting a knee joint; and
    stop means rigidly secured to said arm and spaced from said main frame and said wing frame,
    said stop means being disposed for cooperative engagement with said block as said axis of said assembly and said axis of said arm become aligned such that downward jackknifing of said knee joint is precluded.

2. The invention of claim 1, said stop means overlying said connection after said axes become aligned for precluding downward jackknifing of the knee joint.

3. The invention of claim 1, said block being provided with trunnion means, said uppermost end of the arm hving notch means receiving the trunnion means as the wing frame swings from its upright to its folded position.

4. In a farm implement having a normally horizontal, main, wheel-supported frame and a wheel-supported wing frame having a normally horizontal position and provided wtih hings means pivotally attaching the same to the main frame for up and down swinging movement about a normally horizontal, fore and aft axis, mechanism normally overlying the frames for swinging the wing frame about said hinge means and said horizontal position to an upright position and thence to a folded position overlying the main frame with said mechanism disposed between the frames, said mechanism including:
    an elongated, double acting, fluid pressure, piston and cylinder assembly having a longitudinal axis, said assembly being provided with a cylinder having means at one end thereof pivotally connecting the same to said main frame remote from the hinge means and a reciprocable piston rod having an outermost end and extending outwardly from the opposite end of the cylinder;
    a single, elongated, normally upstanding arm having its longitudinal axis angularly offset relative to the longitudinal axis of said assembly when the wing frame is in said horizontal position;

means pivotally connecting the arm directly to the wing frame at the normally lowermost end of the arm adjacent, but spaced from the hinge means;

a knee joint adjacent the uppermost end of the arm presenting an articulation between the arm and the outermost end of the rod whereby, upon retraction of the rod, a pulling force is applied to the joint to raise the wing frame from said horizontal position to said upright position and to move said axis of the arm into alignment with said axis of the assembly until the wing frame reaches the folded position; and an upstanding lug rigid to the wing frame and disposed between the arm and the hinge means for engagement by the arm and transmitting said pulling force from the assembly to the wing frame, said knee joint having a lost motion connection between the rod and the arm for permitting the wing section to float relative to the main frame during movement of the wheels of the implement over uneven terrain, said arm having stop means overlying said connection after said axes beome aligned for precluding downward jackknifing of the knee joint, there being a block secured to the rod at its outermost end and a pivot pin traversing the block and the arm, said connection being a pin-receiving slot in the block, said block being provide with trunnion means, said uppermost end of the arm having notch means receiving the trunnion means as the wing frame swings from its upright to its folded position, said arm including a pair of spaced bars receiving the block therebetween, said stop means being a plate rigidly interconnecting the bars.

5. The invention of claim 4, the trunnion means including a pair of studs rigid to and extending laterally from the block in opposite directions, each bar having a stud-receiving notch.

* * * * *